(No Model.)

H. F. HILLER.
BICYCLE.

No. 422,781. Patented Mar. 4, 1890.

Witnesses
Fred A. Mason
C. O. Mason

Inventor
Henry F. Hiller
by F. W. Mason atty

UNITED STATES PATENT OFFICE.

HENRY F. HILLER, OF NEW BEDFORD, MASSACHUSETTS.

BICYCLE.

SPECIFICATION forming part of Letters Patent No. 422,781, dated March 4, 1890.

Application filed May 18, 1889. Serial No. 311,274. (No model.)

*To all whom it may concern:*

Be it known that I, HENRY F. HILLER, a citizen of the United States, residing at New Bedford, in the county of Bristol and State of Massachusetts, have invented a new and useful Improvement in Bicycles, of which the following is a specification.

My invention relates to improvements in that class of bicycles which are propelled by means of a sprocket attached to the axle of the rear wheel and connected by a sprocket-chain with a sprocket revolved by means of pedals operated by the feet.

The object of my invention is to enable the bicycle to advance in the direction of its forward movement by momentum or on a downgrade while the pedals remain stationary or at rest; and my invention consists in the peculiar construction and arrangement of the sprocket on the rear wheel of the bicycle, and of the ratchet, by means of which the desired object is attained.

Figure 3:
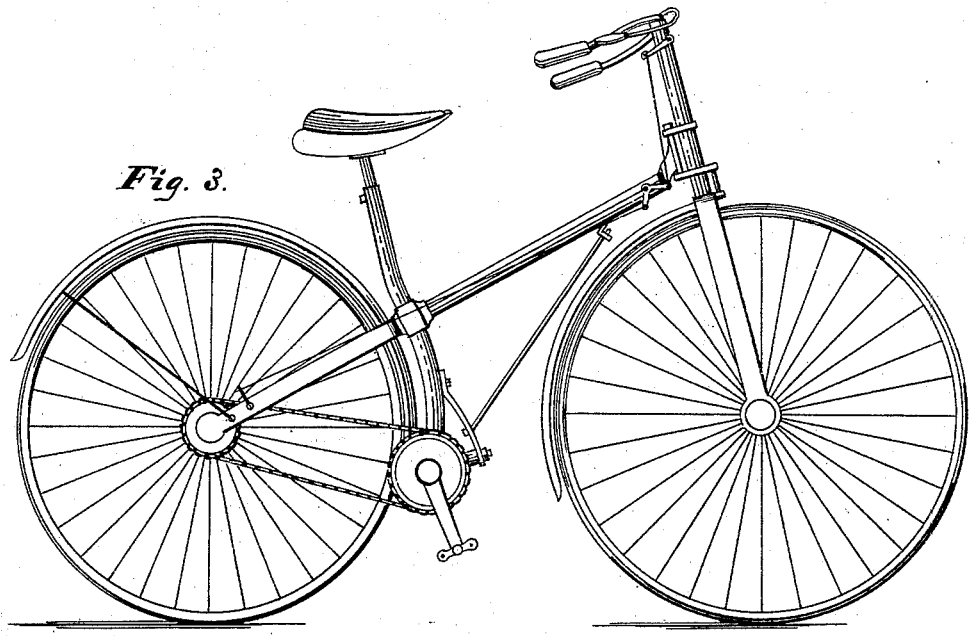
Figure 1:
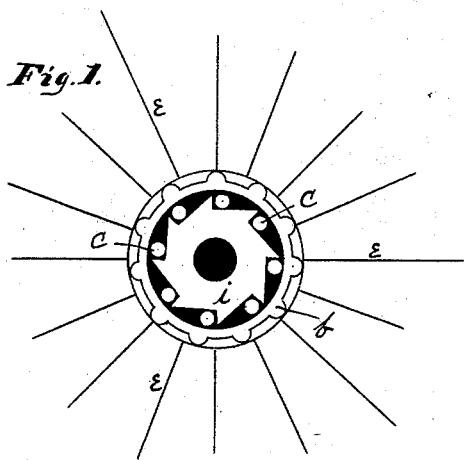
Figure 2:
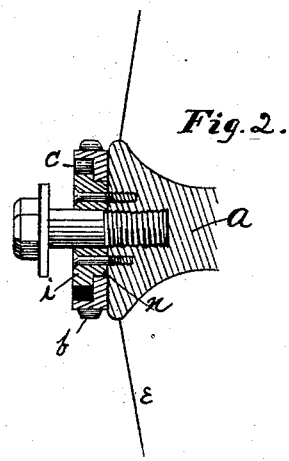

In the accompanying drawings, Figure 1 is an end view of the ratchet, showing its arrangement and operation within the sprocket. Fig. 2 is a view of the ratchet, axle, and sprocket in longitudinal section through its center; and Fig. 3 is a view of my improved bicycle complete.

Similar letters refer to similar parts throughout the several views.

*a* represents the axle of the rear wheel of the bicycle, which has its bearing in the frame of the machine in the usual manner. To this axle is rigidly secured the ratchet-wheel *i*, having shoulder *n*.

*b* represents a sprocket-wheel which has its bearing on the shoulder *n* and is chambered out to receive the thickness of the ratchet-wheel. The flange of the sprocket-wheel *b* is supported between the ratchet *i* and the hub of the wheel.

*c c* represent hardened-steel rollers which fit somewhat loosely between the depression in the edge of the ratchet and the inside surface of the sprocket.

*e e* represent the spokes of the bicycle.

The operation of my improved bicycle is as follows: When force is applied to the sprocket *b* by means of the pedals, forward sprocket-wheel, and sprocket-chain to propel the bicycle in a forward direction, the rollers *c c* become wedged between the inclined surfaces of the ratchet-teeth and the inside surface of the sprocket *b*, and thus the ratchet and the axle to which it is secured take the same motion as the sprocket *b*; but when the bicycle moves in a forward direction by momentum or on a downgrade the ratchet and axle to which it is secured revolve independently of the sprocket *b*.

What I claim is—

In a bicycle having its rear axle provided with a sprocket-wheel connected by a sprocket-chain with another sprocket-wheel having its bearing in the frame of the bicycle and adapted to be propelled by means of pedals, the ratchet *i*, adapted to receive the rollers *c* and having the shoulder *n* and rigidly secured to the axle of the rear wheel, and the sprocket-wheel *b*, chambered out to receive the thickness of the ratchet *i* and having its bearing on the shoulder *n* and its flange supported between the ratchet *i* and the hub of the wheel, all as shown and described.

HENRY F. HILLER.

Witnesses:
HENRY W. MASON,
FRED A. MASON.